United States Patent
West et al.

[11] Patent Number: 5,985,349
[45] Date of Patent: Nov. 16, 1999

[54] METHOD FOR MANUFACTURE OF GRATED CHEESE

[75] Inventors: Leslie G. West, Glencoe; David W. Mehnert, Antioch, both of Ill.

[73] Assignee: Kraft Foods, Inc., Northfield, Ill.

[21] Appl. No.: 09/190,796

[22] Filed: Nov. 12, 1998

[51] Int. Cl.[6] .................................................. A23C 19/00
[52] U.S. Cl. .................. 426/582; 426/384; 426/518; 426/580
[58] Field of Search ...................... 426/518, 580, 426/582, 384, 385, 443, 465

[56] References Cited

U.S. PATENT DOCUMENTS

| | | | |
|---|---|---|---|
| 1,979,124 | 10/1934 | Tival | 99/5 |
| 2,576,597 | 11/1951 | Gootgeld | 99/116 |
| 2,789,909 | 4/1957 | FlosJorf et al. | 99/115 |
| 2,836,368 | 5/1958 | McCoy | 1/17 |
| 3,694,231 | 9/1972 | Izzo et al. | 99/115 |
| 4,382,973 | 5/1983 | de Figueiredo et al. | 426/614 |
| 4,700,899 | 10/1987 | Powers et al. | 241/30 |
| 4,847,107 | 7/1989 | Linse-Loefgren | 426/582 |
| 5,208,055 | 5/1993 | Plochman | 426/93 |
| 5,573,805 | 11/1996 | Fager et al. | 426/515 |

OTHER PUBLICATIONS

Dialog(R) File 51:Food Sci.&Tech Abs, Zobel et al., abstracting DD 160740, 1984.

*Primary Examiner*—Leslie Wong
*Attorney, Agent, or Firm*—Fitch, Even, Tabin & Flannery

[57] ABSTRACT

The present invention is directed to a method for providing granules from cheese. In the method, cheese is first shredded into elongated pieces. The shredded pieces of cheese are then frozen. The frozen shredded pieces are placed in a vacuum chamber and a vacuum is drawn in the chamber. The vacuum chamber is then heated to remove moisture from the frozen shredded pieces. Finally, the shredded pieces are subjected to grinding to provide cheese granules.

18 Claims, No Drawings

METHOD FOR MANUFACTURE OF GRATED CHEESE

FIELD OF THE INVENTION

The present invention is directed to a method for providing granules from cheese. More particularly, the present invention is directed to providing granules from cheese wherein the problem of oiling off of the fat from the cheese during the granule producing process does not occur.

BACKGROUND OF THE INVENTION

"Natural" cheese is made directly from milk by coagulating or curdling milk, stirring and heating the curd, draining off the whey, and collecting or pressing the curd. Desirable flavor and texture are obtained in many cheeses by curing the cheese, that is, holding it for a specified time, at a specific temperature and humidity. This basic method is used to produce a very large number of different types of cheese by altering time, temperature, pH, curd handling and other variables. More than 400 types of cheese are described in the bulletin "Cheese Varieties," *U.S. Department of Agriculture Handbook,* No. 54, 1953, revised 1969.

It is difficult to classify the different cheeses satisfactorily in groups. Cheeses have been classified, however, as (1) very hard (grating), (2) hard, (3) semi-soft, and (4) soft; and as ripened by bacteria, mold, surface microorganisms, or a combination of these, or as unripened. The following are examples of the cheeses in these classifications:

1. Very hard (grating):
   (a) ripened by bacteria: Asiago (old), Parmesan, Romano, Sapsago, Spalen.
2. Hard:
   (a) ripened by bacteria, without eyes: Cheddar, Granular or Stirred-curd and Caciocavallo; and
   (b) ripened by bacteria, with eyes: Swiss, Emmentaler, and Gruyere.
3. Semisoft:
   (a) ripened principally by bacteria: Brick and Muenster;
   (b) ripened by bacteria and surface microorganisms: Limburger, Port du Salut and Trappist; and
   (c) ripened principally by blue mold in the interior: Roquefort, Gorgonzola, Blue, Stilton and Wensleydale.
4. Soft:
   (a) ripened: Bel Paese, Brie, Camembert, Cooked, Hand and Neufchatel (as made in France); and
   (b) unripened: Cottage, Pot, Bakers', Cream, Neufchatel (as made in the U.S.), Mysost, Primost and fresh Ricotta.

It is well known to provide grated very hard cheese. The term "grated" means that small granules of the cheese are produced. The term "grated" does not mean that elongated shreds of the cheese are produced. Grated parmesan is a staple commodity in the market. Grated parmesan cheese is easily provided by simple grating of the cheese on a cheese grater. In the commercial distribution of grated parmesan cheese and other very hard cheeses, the grated particles are usually dried to about 20 percent moisture to improve the shelf life at ambient temperature of the grated cheese.

While there have been attempts to produce granulated cheese from hard cheese, no granulated hard cheese is at this time commercially available. U.S. Pat. No. 3,694,231 to Izzo describes a method for preparing shelf-stable finely divided cheese products. In the method, chunks of cheese and liquified cryogenic gas are introduced into a comminution chamber and are processed so that the cheese is frozen and ground. The resulting comminuted cheese particles are dried from the frozen state in a fluidized bed while maintaining a temperature below about 21° C. The Izzo, et al. patent specifically indicates that vacuum drying of frozen particles is unsatisfactory for dehydration of cheese since the separated cheese products of both hard and soft cheeses are noticeably inferior in color, aroma and flavor, as compared with the natural cheese starting material.

U.S. Pat. No. 4,847,107 to Linse-Loefgren describes a method for preparing finely divided pieces of cheese. In the method, fresh cheese is milled, the milled cheese is cooled to a temperature of from below 0° C. to –50° C., starch is added to and mixed with the chilled cheese and the chilled mixture is disintegrated into finely divided pieces. The finely divided pieces may be incorporated into a dry batter mix.

U.S. Pat. No. 2,836,368 to McCoy describes a general method for pulverizing normally soft substances which contain water. In the method, the substance which may be coarse particles of a food containing natural water, such as potatoes, spinach or apples, are first frozen to a solid and the pieces are thereafter pulverized at low temperature.

Grated cheese, such as cheddar cheese, has not been possible to produce because of oiling off of the fat during the grating or disintegration process. It is known to provide shredded cheese, such as cheddar cheese, and recently very fine shreds of grated cheddar cheese have been produced and marketed. Such very fine shreds are usually about 1/16th to 1/8th inch in width and have a length of from about 3/4 to about 1 1/4 inches.

It would be desirable to provide grated cheese, such as cheddar cheese, which has a particle size similar to that of grated very hard cheese, such as parmesan cheese. Accordingly, it is a principal object of the invention to provide a method for producing grated cheese or granules of cheese. It is another object of the present invention to provide a method for producing grated cheese which does not result in oiling off during the grating process.

These and other objects of the invention will become more apparent from the following detailed description and the accompanying claims.

SUMMARY OF THE INVENTION

The present invention is directed to a method for providing granules from cheese. In the method, cheese is first shredded into elongated pieces. The shredded pieces of cheese are then frozen. The frozen shredded pieces are placed in a vacuum chamber and a vacuum is drawn in the chamber. The frozen shredded cheese pieces in the vacuum chamber are then heated to remove moisture from the frozen shredded pieces. Finally, the shredded pieces are subjected to grinding to provide cheese granules.

DETAILED DESCRIPTION OF THE INVENTION

The present invention is directed to providing granules of cheese. In general, the cheese may be selected from the group consisting of cheddar cheese, washed curd cheese, stirred curd cheese, granular curd cheese, colby cheese, monterey jack cheese, pasta filata cheeses, swiss cheese, emmentaler cheese and gruyere cheese.

The cheese is first shredded to form elongated pieces. The shredded pieces have an average diameter or thickness of from about 1.5 to about 6.0 mm and an average length of from about 12 to about 30 mm. The shredded elongated pieces are then laid as a bed on a tray which can be placed in a vacuum chamber. The bed of shredded pieces is generally from about 1 to about 3 inches thick. The tray of shredded pieces are then are frozen to a temperature of from about –15 to about –25° C. The shredded pieces can be frozen, for example, using a freezer or similar equipment.

The tray containing the frozen shredded pieces is then placed in a vacuum chamber and a vacuum of less than about 1500 microns (i.e., less than about 1.5 mm Hg) absolute pressure, preferably from about 100 to about 1000 microns (i.e., about 0.1 to about 1 mm Hg) absolute pressure, is drawn in the chamber. The temperature in the vacuum chamber is then raised to within the range of from about 10° C. to about 95° C. The temperature of the shredded, frozen pieces and pressure within the chamber are maintained so that the pieces are freeze dried. The shredded pieces are left in the chamber for a time sufficient to remove from about 30 percent to about 40 percent of the moisture which is present in the cheese based on the weight of the cheese. This generally results in a total moisture of from about 20 percent to about 26 percent. The tray is then removed from the chamber and the shredded pieces are subjected to grinding. Grinding is most easily effected through use of a shear type grinder, such as a household blender or a food mill. The shredded pieces can be ground while still frozen or can be ground after reaching ambient temperature. The ground pieces generally have an average diameter or maximum dimension of from about 0.5 to about 3 mm.

The granules of cheese can then be packaged for distribution. If an anticaking agent has not been added to the shredded pieces prior to grinding, it is preferred to add an anticaking agent to the granules prior to packaging. Suitable anticaking agents include starch and microcrystalline cellulose. The anticaking agent is generally added at a level of from about 1 percent to about 2 percent by weight, based on the weight of the cheese.

The following example further illustrates various features of the invention, but is not intended to limit the scope of the invention, as set forth in the appended claims.

EXAMPLE 1

Six month old cheddar cheese (about 10 pounds) was shredded to provide elongated shredded pieces having an average diameter of about 0.15 mm and an average length of about 25 mm. The shredded cheddar cheese was placed in a tray (about 60×45 cm with a depth of about 4.5 cm). The bed of shredded pieces in the tray was about 1½ inches in depth. The tray was placed in a vacuum chamber and a vacuum of 100 microns (i.e., about 0.1 mm Hg) absolute pressure was drawn. The vacuum chamber was then heated to 25° C. Moisture was removed from the cheese pieces and the moisture was condensed on a chill plate. The moisture of the cheddar cheese was reduced from about 35 percent to about 24 percent. The shredded pieces were then removed from the vacuum chamber and placed in a household blender. The shredded pieces were ground in the blender to provide granules having a maximum diameter of about 3.5 mm.

What is claimed is:

1. A method for providing granules from cheese, said method comprising the steps of:
   (a) shredding cheese to form elongated pieces;
   (b) freezing the elongated pieces;
   (c) placing the frozen elongated pieces in a vacuum chamber;
   (d) drawing a vacuum in the vacuum chamber;
   (e) heating the frozen elongated pieces in the vacuum chamber to remove moisture from the frozen elongated pieces by freeze drying, and
   (f) grinding the elongated pieces from step (e) to provide cheese granules.

2. A method in accordance with claim 1, wherein the elongated pieces have an average diameter of about 1.5 to about 6.0 mm and an average length of about 12 to about 30 mm.

3. A method in accordance with claim 1, wherein the cheese is selected from the group consisting of cheddar cheese, washed curd cheese, stirred curd cheese, granular curd cheese, colby cheese, monterey jack cheese, pasta filata cheeses, swiss cheese, emmentaler cheese and gruyere cheese.

4. A method in accordance with claim 3, wherein the cheese is cheddar cheese.

5. A method in accordance with claim 1, wherein the elongated pieces are frozen to a temperature of from about −15° C. to about −25° C. in step (b).

6. A method in accordance with claim 1, wherein the vacuum in the vacuum chamber is less than about 1500 microns absolute pressure.

7. A method in accordance with claim 6, wherein the vacuum in the vacuum chamber is from about 100 to about 1000 microns absolute pressure.

8. A method in accordance with claim 1, wherein the frozen elongated pieces in the vacuum chamber are heated to a temperature within the range of from about 10° C. to about 95° C. in step (e).

9. A method in accordance with claim 1, wherein the moisture removed from the frozen elongated pieces is from about 30 percent to about 40 percent by weight, based on the weight of the frozen elongated pieces.

10. A method in accordance with claim 1, wherein the average diameter of the cheese granules is from about 0.5 to about 3 mm.

11. A method in accordance with claim 1, wherein the grinding is effected by means of a high speed shearing type grinder.

12. A method for providing granules from cheese, said method comprising the steps of:
   (a) shredding cheese to form elongated pieces having an average diameter of about 1.5 to about 6.0 mm and an average length of about 12 to about 30 mm.;
   (b) freezing the elongated pieces at a temperature of from about −15° C. to about −25° C.;
   (c) placing the frozen elongated pieces in a vacuum chamber;
   (d) drawing a vacuum in the vacuum chamber of less than about 1500 microns absolute pressure;
   (e) heating the frozen elongated pieces in the vacuum chamber to a temperature within the range of from about 10° C. to about 95° C. to remove moisture from the frozen elongated pieces by freeze drying, and
   (f) grinding the elongated pieces from step (e) to provide cheese granules.

13. A method as defined in claim 12, wherein the cheese is selected from the group consisting of cheddar cheese, washed curd cheese, stirred curd cheese, granular curd cheese, colby cheese, monterey jack cheese, pasta filata cheeses, swiss cheese, emmentaler cheese and gruyere cheese.

14. A method as defined in claims 13, wherein the cheese is cheddar cheese.

15. A method as defined in claim 14, wherein the vacuum in the vacuum chamber is from about 100 to about 1000 microns absolute pressure.

16. A method as defined in claim 13, wherein the moisture removed from the frozen elongated pieces is from about 30 percent to about 40 percent by weight, based on the weight of the frozen elongated pieces, and wherein the average diameter of the cheese granules is from about 0.5 to about 3 mm.

17. A method as defined in claim 14, wherein the moisture removed from the frozen elongated pieces is from about 30 percent to about 40 percent by weight, based on the weight of the frozen elongated pieces, and wherein the average diameter of the cheese granules is from about 0.5 to about 3 mm.

18. A method as defined in claim 15, wherein the moisture removed from the frozen elongated pieces is from about 30 percent to about 40 percent by weight, based on the weight of the frozen elongated pieces, and wherein the average diameter of the cheese granules is from about 0.5 to about 3 mm.

* * * * *